United States Patent [19]

Tawil et al.

[11] Patent Number: 5,179,281
[45] Date of Patent: Jan. 12, 1993

[54] EXTREMITY DOSIMETRY SYSTEM, DOSIMETER AND METHOD

[75] Inventors: Riad A. Tawil, Kirtland; James D. Chamberlain, Maple Heights; William Bruml, Cleveland Hts., all of Ohio

[73] Assignee: Solon Technologies, Inc., Solon, Ohio

[21] Appl. No.: 736,446

[22] Filed: Jul. 26, 1991

[51] Int. Cl.$^5$ .............................................. G01T 1/11
[52] U.S. Cl. ................................. 250/337; 250/484.1
[58] Field of Search ......................... 250/337, 484.1 B

[56] References Cited

U.S. PATENT DOCUMENTS

| 3,638,017 | 1/1972 | Jones et al. | 250/337 |
| 3,894,238 | 7/1975 | Cox et al. | 250/484.1 |
| 4,835,388 | 5/1989 | Bruml et al. | 250/337 |

FOREIGN PATENT DOCUMENTS

| 56-132582 | 10/1981 | Japan | 250/337 |
| 01-143993 | 6/1989 | Japan | 250/484.1 A |
| 1259836 | 6/1972 | United Kingdom | 250/337 |

OTHER PUBLICATIONS

Dutt et al., "The Performance of a New Extremity and Skin Dosemeter", Radiation Protection Dosimetry, vol. 6, No. 104, pp. 257-260.
Pitman Instruments, Brochure Entitled: "Autoledo Automatic TLD Reader" (1978).
Matsushita Electric Industrial Co., Ltd. Document Entitled: "Specification of TL Badge".
Matsushita Electric Industrial Co., Ltd. Document Entitled: "General Specifications of Extremity Dosimeter Model UD-817A".
Matsushita Electric Industrial Co., Ltd., Document Entitled: "Specifications of Extremity Dosimeter Loader UD-797A".
Matsushita Electric Industrial Co., Ltd., Document Entitled: "Four Components of the System".
Panasonic, Brochure Entitled: "New TLD Access Control System".
Panasonic, Brochure Entitled, "New TLD 'TL Badge System'".
Alnor, Brochure Entitled: "Thermoluminsescent Dosimetry Results You Can Trust".
Alnor, Brochure Entitled: "Thermoluminescent Dosimetry System Reader and Irradiator".

Primary Examiner—Constantine Hannaher
Attorney, Agent, or Firm—Renner, Otto, Boisselle & Sklar

[57] ABSTRACT

System and method for extremity dosimetry, that enables the maintenance of a chain of custody from dosimeter issuance to dosimeter read and further through multiple reuses of the dosimeter, are uniquely characterized by a reusable extremity dosimeter comprising a solid thermoluminescent (TL) body affixed as by bonding to a non-luminescent substrate that has integrally associated therewith indicia embodying a machine readable identification code. A preferred holder for the extremity dosimeter comprises a generally flat and flexible pouch that may be disposable, the dosimeter pouch including at least one pocket for containing the extremity dosimeter. Provision is made for attaching the dosimeter pouch to the body of a user at a specified extremity location such as a finger, wrist, toe, ankle, elbow, knee, forehead, etc. Also disclosed is a carrier for enabling the reading of the extremity dosimeters in TLD readers designed to read TLD cards containing multiple TL elements.

15 Claims, 3 Drawing Sheets

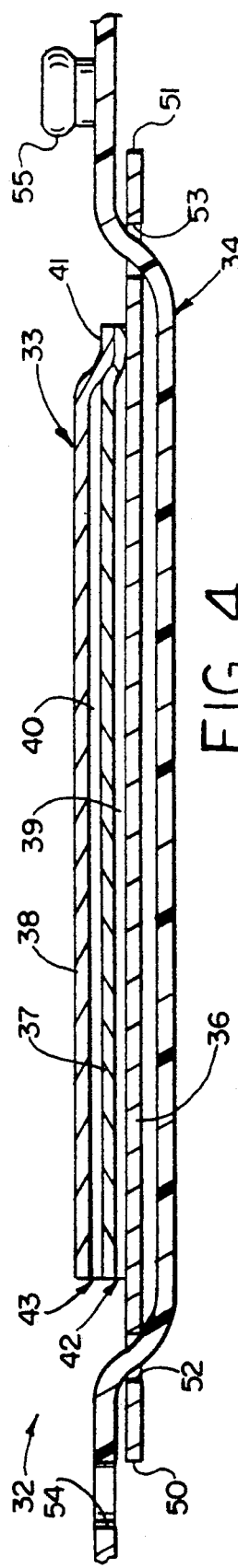
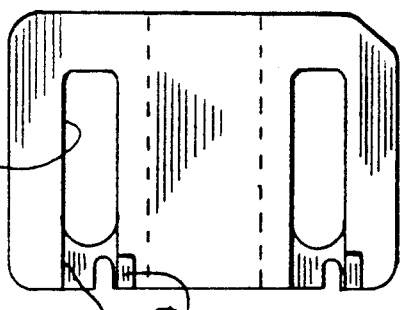
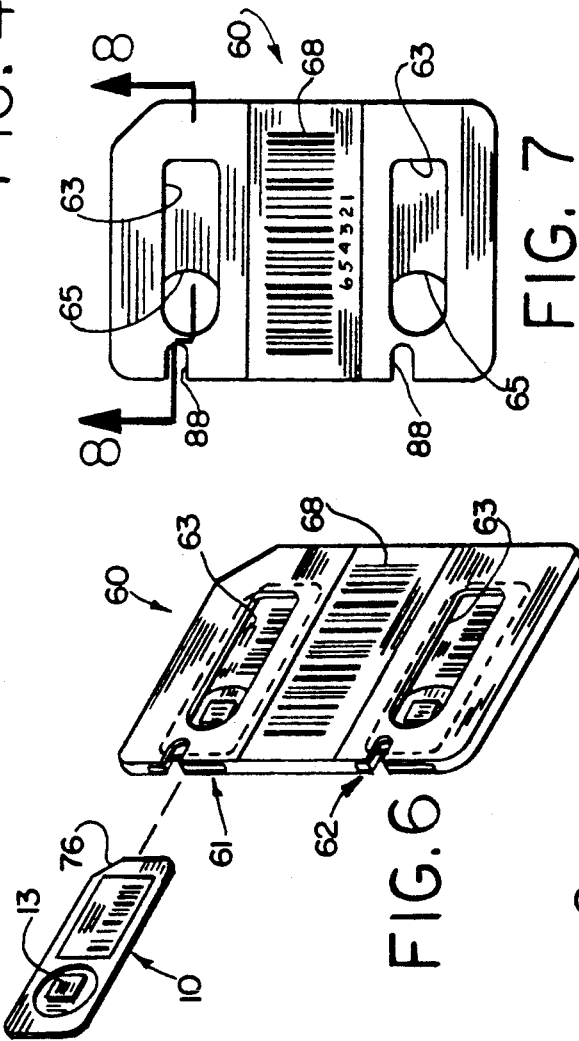
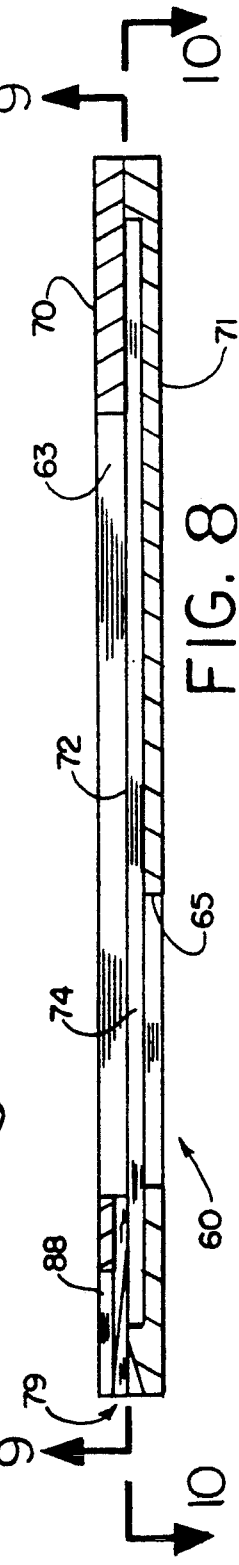

EXTREMITY DOSIMETRY SYSTEM, DOSIMETER AND METHOD

The invention herein described relates generally to thermoluminescent dosimetry and, more particularly, to extremity dosimetry wherein exposure of specific parts of a body to radiation is sought to be monitored.

BACKGROUND

Thermoluminescent dosimetry, commonly referred to as TLD, is a technique for radiation dose measurement. A thermoluminescent (TL) material after having been exposed to an incident flux of charged particles such as beta rays, uncharged particles such as neutrons, or electromagnetic energy such as gamma rays and x-rays, will emit light when heated. When the emitted light is measured as a function of the temperature of the TL material over time, a glow curve is produced. The glow curve can be analyzed to determine the quantity of radiation to which the TL material had been exposed.

TLD systems have been developed for monitoring the exposure of personnel who work in the vicinity of radioactive materials, x-ray equipment, etc. Each person being monitored is issued a badge to wear so that the badge will be exposed to the same type and dosage of radiation as is the person wearing the badge. Although different types of badges have been used, one commonly used badge consists of an outer holder that houses a TLD card insert usually containing two, three or four TL elements. The TL elements are sandwiched between two sheets of transparent Teflon polytetrafluoroethylene (PTFE) that encapsulate the TL elements, and this sandwich is secured between two aluminum plates that have aligned holes forming respective windows for the TL elements.

Periodically the TLD cards are processed through a TLD reader to produce an exposure record for each person being monitored. In the TLD card reader, the TL elements in each card are heated and the thermoluminescence as function of TL element temperature is measured as by using a photomultiplier tube. The photomultiplier tube response is processed electronically to provide a measurement of TL integrals and/or the glow curve. After the cards have been read, the TL elements typically are annealed so that they can be used again.

Various methodologies have been devised for maintaining a chain of custody of the TLD cards and badges so that the reported dose for each TLD card may be reliably related back to the person who had worn that card. To facilitate the distribution, collection and reading of the TLD cards and the correlation of the TL data to the individuals wearing the badges, the TLD cards, and the holders as well, have been provided with machine readable bar codes. The machine readable bar codes enable automatic card and/or holder identification by a TLD card reader and also direct input of the identification codes into a computer monitoring system, thereby avoiding manual keyboard entry and the potential for human error associated therewith. When a card and holder are issued to an individual, the identification numbers of the card and holder assigned to the individual are stored with the individual's name in a database along with other desired pertinent data such as card type, date of last anneal, date issued, current location of the card and holder, etc. The cards and holders may be issued at a main distribution center to which the cards and holders are returned for processing through the TLD reader or at one or more remote site issue stations. The name of the person to whom each card and holder have been issued may be included on a label applied to the holder for easy identification, as may other information as well.

While chain of custody systems have been developed and used for whole person radiation monitoring, an effective and reliable chain of custody system heretofore has not been developed for extremity monitoring which is primarily concerned with the exposure of different parts of the body, rather than the whole body, to non-ionizing or non-penetrating radiation such as charged particles, beta particles and exotic particles. The above mentioned TLD cards and holders are unsuitable for extremity monitoring because of their large size and bulkiness. Extremity dosimeters are typically small and have been carried in various wearing devices such as rings, bandaid-type devices, finger sacks and gloves. A commonly used extremity dosimeter has TL material mounted to a disc that can be inserted into a ring for wearing. Recently, a number has been printed on the discs to permit identification of the disc independently of the ring which holds the dosimeter. Although thus numbered, a TLD system has not been devised which has provision for machine reading of the identification number printed on the discs and hence manual entry of the identification number necessarily has been involved.

Another but unsuccessful approach to extremity dosimetry involved the use of a finger ring dosimeter in the form of a thin strip or band. The dosimeter band had at one end thereof a quanity of TL powder material sandwiched between two sheets of material that were bonded to one another in some manner. Also sandwiched between the two sheets was a label bearing a machine readable bar code and a corresponding human readable identification number. To read the dosimeter, the two sheets would be pulled apart to free the TL powder for reading. One consequence of this is that the prior integral relationship between the active TL material and the identification bar code would be lost and consequently there would be a break in the chain of custody, such that the now loose identification bar code could inadvertently become associated with the wrong TL material. Another drawback is that the dosimeter could not be used more than once.

SUMMARY OF THE INVENTION

The present invention provides a new system and method for extremity dosimetry that has advantages heretofore not associated with extremity dosimetry. The system and method enables the maintenance of a chain of custody from dosimeter issuance to dosimeter read and further through multiple reuses of the dosimeter. The system and method also enable effective and reliable extremity monitoring of charged and uncharged particles that heretofore could not be as successfully monitored by extremity dosimeters presently in use.

The extremity dosimeter system and method of the invention are uniquely characterized by a reusable extremity dosimeter comprising a solid thermoluminescent (TL) body affixed as by bonding to a non-luminescent substrate that has integrally associated therewith indicia embodying a machine readable identification code. In accordance with a preferred embodiment of dosimeter according to the invention, the substrate is formed of a flexible material capable of maintaining its structural and functional integrity at temperatures up to about 300° C. and more preferably at temperatures up to about 400° C. and higher. A preferred composite substrate includes a first layer of a polyimide material to which the solid TL body is bonded by a polyimide liquid adhesive and a second layer preferably of equal or greater thickness. The second layer is affixed to the first layer for providing additional thickness and corresponding stiffness and strength to the substrate to facilitate handling and manipulation of the dosimeter. The second layer includes an aperture in which the solid TL body is at least partly contained. The TL material in the solid body preferably is an alkali/alkaline metal-fluoride TLD material. Preferably the dosimeter is reusable at least about 25 times and more preferably about 50 times and higher.

A preferred holder for the extremity dosimeter comprises a generally flat and flexible pouch that may be disposable. The dosimeter pouch includes at least one pocket for containing the extremity dosimeter and means are provided for attaching the dosimeter pouch to the body of a user (i.e., person being monitored for radiation exposure) at a specified extremity location such as a finger, wrist, toe, ankle, elbow, knee, forehead, etc. In a preferred embodiment the pocket is formed between two thin flexible panels of plastic or like material which are peripherally joined together as by heat sealing or welding to form the pocket. Pouches of various sizes and configurations may be provided to receive in the pocket thereof other types of dosimeters such as a disc dosimeter that includes on the substrate thereof indicia embodying a machine readable identification code.

The dosimeter pouch is initially fabricated with an opening along one edge for insertion of one or more dosimeters and, if desired, an associated filter or filters. The opening may then be closed by heat sealing or equivalent means to provide a protective sealed enclosure for the dosimeter. If the TL material is not sensitive to light, at least one of the panels or at least a portion thereof proximate the indicia on the dosimeter may be transparent to provide a window through which the indicia may be viewed and machine read from outside the dosimeter pouch. Alternatively, especially if the TL material is light sensitive, both panels may be opaque to block light from reaching the TL material and causing a spurious response. In either case the dosimeter pouch may be provided with an integral label bearing indicia that may identify the person to whom the dosimeter contained therein has been assigned as well as other information including, in particular, a machine readable bar code identifying the dosimeter pouch. In a preferred embodiment the label is applied to the dosimeter pouch by insertion in a second pocket that may be closed by heat sealing or welding to make the label integral with the pouch when worn by a user. In this configuration the two pockets share a common panel and the other panel forming the label pocket has at least a portion thereof that is transparent for viewing of the label from outside the dosimeter pouch.

In accordance with a specific wearing modality according to the invention, the dosimeter pouch is provided at opposite ends thereof with slots through which a strap is threaded, whereby the dosimeter pouch and dosimeter contained therein may be worn as a ring, wrist band, ankle band, arm band, etc. Preferably the strap is adjustable in length to accommodate different thickness body appendages, or can be linked with an additional strap or straps to form a longer strap for larger diameter body appendages. Additionally or alternatively, the strap may be replaced with a different length or type of strap for different applications. By way of further specific example the strap may have adhesive backed end portions for adhering the dosimeter pouch to the user's body, such as at the forehead, in a bandaid-like manner.

The invention also provides a carrier for enabling the reading of the extremity dosimeters in TLD readers designed to read the aforementioned TLD cards containing multiple TL elements. The carrier, which has essentially the same external configuration as the TLD card, is provided with one or more dosimeter slots or pockets for receiving the individual dosimeters and positioning the active TL element thereof at one of the four read sites of the TLD card. One side of the carrier is provided with a window for each slot or pocket through which the identification code on the extremity dosimeter may be machine read by the TLD reader or by a separate decoder associated with the TLD reader, so that the TL response data will be correctly reported with assurance for each dosimeter that is tagged to a specific individual in the system's database.

With the aforedescribed extremity dosimeter and holder (e.g., the aforementioned pouch), a chain of custody may be reliably maintained for extremity radiation monitoring. In accordance with the invention this is accomplished by an extremity chain of custody system and method which controls distribution and reception of dosimeters and reliably correlates personnel information to the extremity dosimeter as well as the calculated extremity radiation dose values. The system and method may employ a main distribution station and/or site issue station whereat one or more dosimeters (or holders containing dosimeters) are issued to a user. The identification numbers of each dosimeter and its corresponding holder issued to a user are electronically stored with the user's name in a database maintained by a computerized information storage system, along with other desired pertinent data such as filter type (if any), date and time of last anneal, individual's work location, body position, date and time issued, etc. When an extremity dosimeter is loaded into a holder, preferably a label is printed or otherwise generated for affixation to the holder in which the extremity dosimeter is inserted, the label including identifying indicia and, in particular, a machine readable holder identification code for machine input thereof into the computerized information storage system.

After a prescribed period the holders are received for processing the extremity dosimeters contained therein through a TLD reader. Reception of the holders at a central receiving station is logged into the system database, and the extremity dosimeters are removed from the holders and read in the TLD reader. In conjunction therewith the identification code on each dosimeter is machine read and the TL response data is reported for that identification code independently of any human correlation of the TL response data to a specific dosimeter and/or individual.

The foregoing and other features of the invention are hereinafter fully described and particularly pointed out in the claims, the following description and the annexed drawings setting forth in detail a certain illustrative and preferred embodiment of the invention, this being indicative, however, of but one of the various ways in which the principles of the invention may be employed.

BRIEF DESCRIPTION OF THE DRAWINGS

FIG. 4 is an enlarged fragmentary cross-sectional view of the holder and strap of FIG. 3, taken substantially along the line 4—4 of FIG. 3, and wherein thicknesses of thin elements have been exaggerated for illustration purposes.

FIG. 6 is a perspective view of a carrier for use in reading of the extremity dosimeters.

FIG. 7 is a plan view of the carrier of FIG. 6.

FIG. 8 is an enlarged cross-sectional view of the carrier taken substantially along the line 8—8 of FIG. 7.

FIG. 9 is a cross-sectional view of the carrier taken substantially along the line 9—9 of FIG. 8.

DETAILED DESCRIPTION

As above summarized, the present invention provides a system and method for establishing a chain of custody for extremity dosimetry. The system and method utilize an integrally encoded extremity dosimeter that can be conveniently worn at any or almost any location of a user's body through the use of various wearing modalities including, for example, rings, bandaid-type devices, finger sacks, gloves, etc. The extremity dosimeter is integrally encoded with a machine readable identification code used to directly and continuously relate the dosimeter to the individual to whom it is issued. The distribution and reception of the dosimeters is controlled through information processing equipment including one or more scanning devices for direct input of the machine readable identification codes into the information processing equipment that reliably correlates personnel information to the extremity dosimeter as well as the TL response data. Further details of the overall extremity dosimetry system and method are described after the following description of a preferred embodiment of extremity dosimeter that enables the maintenance of a chain of custody in extremity dosimetry.

Figure 1:
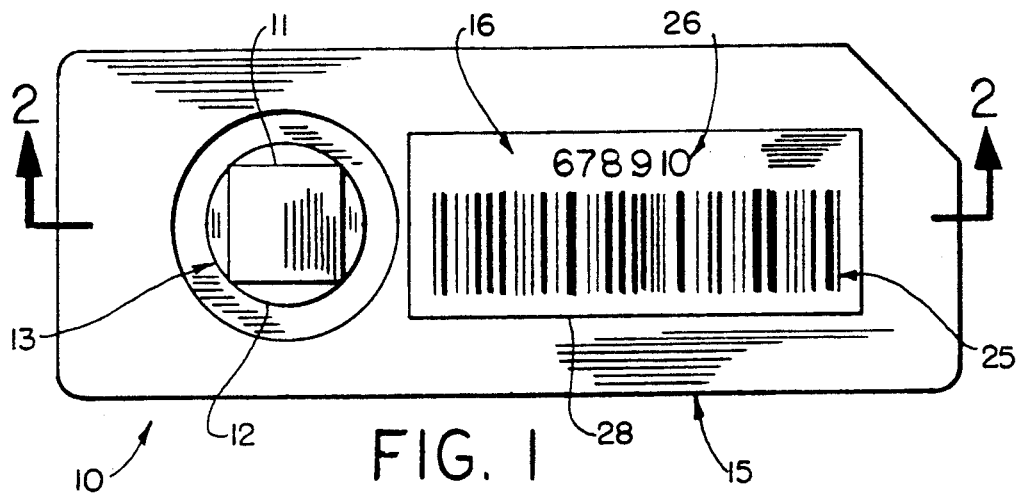
FIG. 1 is a plan view of an extremity dosimeter according to the invention.
Figure 2:
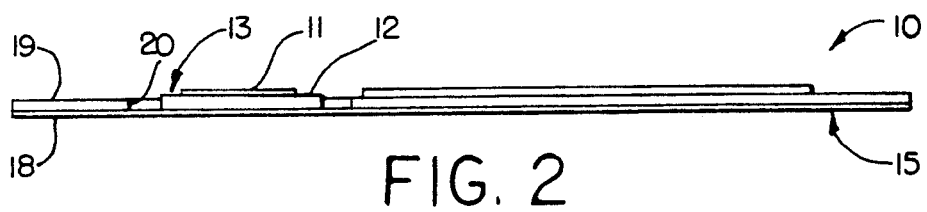
FIG. 2 is a cross-sectional view through the extremity dosimeter of FIG. 1, taken along the line 2—2 of FIG. 1, and wherein thicknesses of relatively thin elements of the dosimeter have been exaggerated for illustration purposes.

Referring now to FIGS. 1 and 2, a preferred embodiment of extremity dosimeter according to the invention is indicated generally at 10. The dosimeter 10 comprises a TL element 11 consisting of a thin solid body of TL material. In the illustrated embodiment the TL element is bonded to an inert rigid substrate 12 of greater thickness to add ruggedness to the otherwise fragile active TL element. By way of specific example, the TL element is a thin solid body of LiF-TLD material (0.0036 inch thick and ⅛ inch by ⅛ inch square) that is bonded to an inert LiF rigidifying substrate of greater thickness (for example, 0.011 inch thick and 4.5 mm in diameter) to form a composite solid TL body 13. Bonding is effected in the manner described in Velbeck et al. U.S. patent application Ser. No. 07/620,267, which is hereby incorporated herein by reference in its entirety. That is, a liquid organic adhesive, more particularly a Pyralin 2566 polyimide liquid material sold by DuPont Company of Wilmington, Del., U.S.A., is used to bond the thin body of TL material to the inert LiF substrate. For thicker and/or more rugged TL elements, a supporting inert substrate may not be needed, in which case the TL body 13 may be entirely composed of TL material. The thickness of the solid TL element or body may vary from application to application with exemplary thicknesses ranging from about 0.0036 inch to about 0.035 inch.

The type of TL material utilized will depend on the type of radiation to be detected. Non-hygroscopic TL materials and specifically alkali/alkaline earth metal-fluoride TL materials are preferred because they can be used bare (i.e., without a coating or encapsulation protecting against moisture contamination) to obtain increased sensitivity. Specific exemplary TLD materials are available from Solon Technologies, Inc. (formerly The Harshaw Chemical Company) of Solon, Ohio under product designations TLD-100 (LiF), TLD-200 ($CaF_2$:Dy), TLD-400 ($CaF_2$:Mn), TLD-600 ($^6$LiF) and TLD-700 ($^6$LiF).

The TL body 13 is affixed to a non-luminescent substrate 15 that has indicia 16 integrally associated therewith. In accordance with the illustrated preferred embodiment, the dosimeter substrate 15 is in the form of a thin strip or band which, for example, may have a length of about 1 inch, a width of about ⅜ inch and a thickness of about 7 mil. A preferred substrate is a composite substrate including a first layer 18 to which the TL chip 13 is bonded and a second layer 19 of equal or greater thickness. The second layer is affixed to the first layer for providing additional thickness and corresponding stiffness and strength to the substrate 15 to facilitate handling and manipulation of the dosimeter. The second layer 19, being on the front side of the first layer 18, is provided with a circular aperture 20 in which the TL body 13 is centrally disposed and at least partly contained. By way of specific example the aperture 20 has a diameter of about ¼ inch.

The dosimeter substrate 15 preferably is formed of a flexible material capable of maintaining its structural and functional integrity at temperatures up to at least about 300° C., more preferably up to at least about 400° C. and still more preferably up to at least about 425° C. or higher. More particularly, a preferred material for the layers 18 and 19 of the dosimeter substrate 15 is a polyimide film and, more specifically, a Kapton HN aromatic polyimide film sold by the DuPont Company of Wilmington, Del. The back substrate layer 18 may have a thickness of about 0.5–3 mil, more preferably a thickness of about 1–2 mil, and most preferably a thickness of about 2 mil. The other or rigidifying layer 19 may have a thickness of 2–10 mil, more preferably a thickness of 4–7 mil, and most preferably a thickness of about 5 mil.

The TL body 13 preferably is affixed to the layer 18 of the dosimeter substrate by a high temperature organic liquid adhesive generally in the manner described in the aforementioned U.S. patent application Ser. No. 07/620,267. The preferred liquid adhesive is unthinned Pyralin 2555 polymide.

More particularly, unthinned Pyralin 2555 polyimide is placed on the Kapton HN film substrate layer 18 after the substrate layer 18 has been cleaned with a suitable cleaning/degreasing agent such as isopropanol. The amount of the liquid bonding agent should be sufficient enough to avoid the formation of undesirable gaps in the adhesive between the TL body and the substrate layer 18 which weakens the bond, but less than an amount that would cause substantial "swimming" of the TL body or excess liquid adhesive to partly or completely cover the otherwise bare surface of the TL element 11 opposite the substrate layer. During the placement of the liquid adhesive on the Kapton film substrate layer, the substrate layer preferably is supported on a rigid flat surface of a clamp plate. The TL body is then placed onto the liquid adhesive. The bottom surface of the TL body need not be polished and, in fact, it has been found that a non-polished surface may promote the bond formed between the TL body and the Kapton film that preferably is about 1-2 mil thick and more preferably about 2 mil thick. Thicker films have a tendency to degrade the bond and an adequate bond has not yet been attained with, for example, a 5 mil thick Kapton film. After the TL body has been placed onto the liquid adhesive, a top clamp plate is placed atop the TL body to form a sandwich with a rigid flat surface thereof engaging the TL body. Clamping pressure is then applied to the sandwich to apply uniform, unidirectional force to the TL body and the Kapton film. The clamped sandwich assembly is placed into an oven preheated at 90° C. for 20 minutes and then in a furnace preheated to 400° C. for 6 minutes to cure the Pyralin 2555 and bond the TL body to the Kapton film, this generating temperatures at the bonding interface of about 75° C. and about 240° C., respectively, at a clamping pressure of about 380 psi. This bonding technique provides an excellent bond between the TL body and the Kapton film which is free from air pockets and which can be subjected to repeated heating cycles and temperatures up to 425° C. and possibly as high as 450° C. without bond failure or incomplete glow curve readouts.

Before or after the TL body 13 is affixed to the substrate layer 18, the two substrate layers may be affixed to one another as by use of the aforementioned Pyralin 2566 polyimide adhesive. Although other adhesives or techniques may be employed to bond the two layers together, the bond formed therebetween should be capable of withstanding the high temperature to which it may become exposed during reading of the TL element to extract therefrom radiation dose information.

As above indicated, the dosimeter substrate 15 has integrally associated therewith indicia 16. The indicia 16 comprises a machine readable information code in the form of a linear bar code 25 and a corresponding human readable identification code 26 consisting of numeric or alphanumeric characters. The indicia may be applied by printing directly onto the dosimeter substrate using an ink capable of withstanding the high temperatures to which the dosimeter may be exposed during reading. Alternatively, and as shown, the indicia may be applied to the dosimeter substrate 15 by affixing a label 28 bearing the indicia to the dosimeter substrate. The label should be made of a material capable of withstanding the high temperatures that may be encountered by it during reading of the dosimeter as should the adhesive used to adhere the label to the dosimeter substrate. If desired, the label may be sandwiched beteen the two substrate layers 18 and 19 provided that the layer through which the indicia is viewed has sufficient transparency to permit reading of the indicia.

It is important that the indicia remain integral with the extremity dosimeter 10 during its normal use. That is, the label 28 remains affixed to the dosimeter 10 at all times as does the TL body 13. The TL body is never removed from the dosimeter nor is the label detached from the dosimeter during wearing, reading or at any other time. This is a fundamental requirement for insuring a chain of custody during distribution, reception and reading of the extremity dosimeter.

Figure 3:
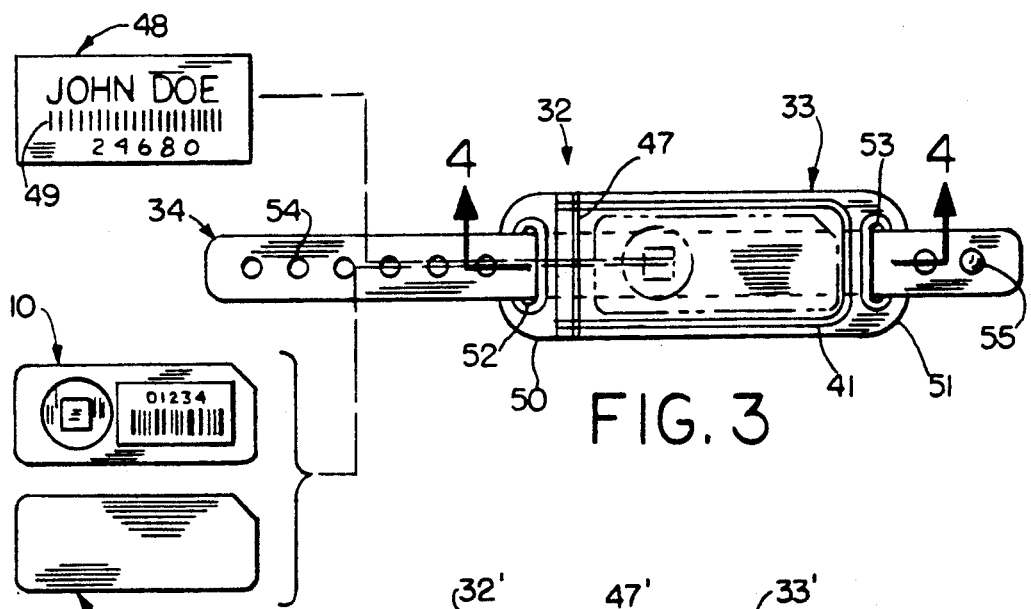
FIG. 3 is a plan view of a holder and strap for the extremity dosimeter of FIG. 1.

Referring now to FIGS. 3 and 4, a preferred wearing device for the dosimeter 10 is indicated generally at 32. The wearing device 32 comprises a generally flat and flexible dosimeter holder in the form of a pouch 33 that may be disposable and a reusable strap 34 for attaching the dosimeter pouch to a body part. In the illustrated embodiment the pouch includes a base panel 36 to which two additional panels 37 and 38 are joined to form two pockets 39 and 40. The panels preferably are formed of thin flexible sheet material so the pocket may be readily conformed, for example, to a body part such as a finger, wrist, arm, ankle, forehead, etc.

The thin flexible panels 36-38 of the illustrated pouch 33 are joined together along the perimeters of the pockets 39 and 40 as by heat sealing or ultrasonic welding along line 41, the pocket 39 being formed between the base and intermediate panels 36 and 37 and the pocket 40 being formed between the intermediate and outer panels 37 and 38.

The dosimeter pouch 33 is initially fabricated with juxtaposed edges thereof left unsealed at one end thereof thereby to form openings 42 and 43 for insertion of one or more dosimeters, an associated filter or filters, and/or label or labels. Normally one or more dosimeters 10 and filters 45 will be inserted through opening 43 into the outer pocket 40, the number of dosimeters and type of filtration, if any, being dependent on the radiation type or types to be detected. Also, a label 48 may be inserted in the inner pocket 39 and then both pockets may be simultaneously closed along heat seal line 47. When thus closed, the pouch provides a protective enclosure for the dosimeter/dosimeters, filter/filters and label.

The label 48 preferably includes a machine readable bar code 49 uniquely identifying the dosimeter pouch. In some applications the label 48 or another later applied label may be imprinted with the name or other identification of the person to whom the pouch has been assigned as well as other information. In the illustrated pouch the two pockets share a common panel, i.e., the intermediate panel 37, and the other panel forming the label pocket, i.e., the base panel 36, has at least a portion thereof that is transparent for viewing of the label from outside the dosimeter pouch.

If the TL material of the extremity dosimeter is not sensitive to light, at least one of the panels of the pouch or at least a portion thereof proximate the indicia on the dosimeter may be transparent to provide a window through which the indicia may be viewed and machine read from outside the dosimeter pouch. Alternatively, especially if the TL material is light sensitive, both panels 36 and 37 forming the outer dosimeter pocket 40 may be opaque to block light from reaching the TL material and causing a spurious response.

In accordance with a specific wearing modality according to the invention, the base panel 36 of the dosimeter pouch 33 has opposite end or tab portions 50 and 51 extending beyond the pockets and these end portions are provided with slots 52 and 53 through which a strap 34 is threaded. By this provision of a strap which has mateable connecting means 54 and 55 at the ends thereof for forming a loop, the dosimeter pouch, and the dosimeter or dosimeters contained therein, may be worn as a ring, wrist band, ankle band, arm band, etc. Preferably the strap is adjustable in length to accommodate different thickness body appendages. In the illustrated embodiment the connecting means 54 and 55 comprise holes and button posts, respectively, which may be mated in different positions to provide different sizes of loops to fit, for example, different finger sizes. Additionally or alternatively, the strap may be replaced with a different length or type of strap for different applications. Preferably the strap is threaded through the end portions of the pouch and worn such that the outer pocket 40 containing the dosimeters will be positioned away from the user's body so that only the single outer wall 38 covers the contents of the outer pocket as desired for increased sensitivity to charged particles and other non-ionizing radiation. As will be appreciated the straps may be separated from the dosimeter pouches and reused with other pouches. The illustrated strap may be made of 6-30 mil flexible vinyl material and is particularly suited for wearing as a ring.

The panels 36-38 preferably are made of a flexible plastic material such as a flexible vinyl. The pocket forming panels 37 and 38 may be a 6 mil vinyl, for example, and the base panel may be a 10-12 mil vinyl for added strength. For detection of low energy non-penetrating radiation such as betas, alphas and low energy gammas, the outer panel 37 preferably is a low density plastic material such as a vinyl having a thickness no greater than about 6 mil and more preferably no greater than about 4 mil.

In the illustrated pouch the pocket forming panels 37 and 38 are located on the same side of the base panel 36. In an alternative arrangement the pocket forming panels may be located on opposite sides of the base panel, thereby providing a front pocket for the dosimeter and a back pocket for the label. The front and base panels would then be opaque to block light from reaching the TL material and the back panel would be transparent for viewing the label from outside the pouch (when not covered by the strap unless the strap also is transparent or has a window for viewing the label). Again, the base panel may be a 10-12 mil vinyl and the pocket forming front and back panels may be a 6 mil vinyl.

Figure 5:
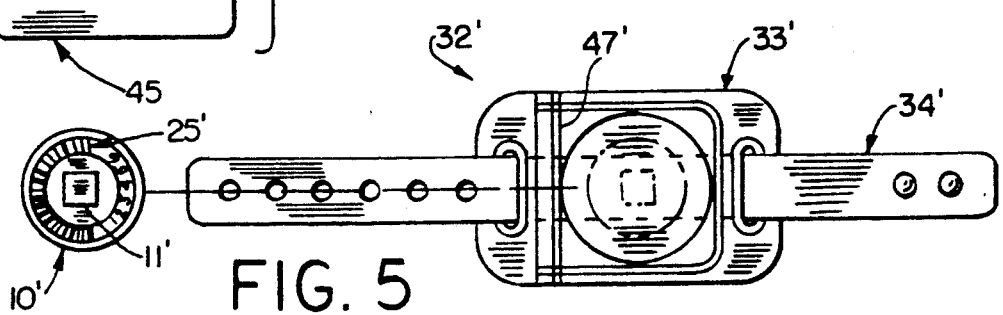
FIG. 5 is a plan view of a modified form of a holder and strap for a disc-like extremity dosimeter.
Figure 10:
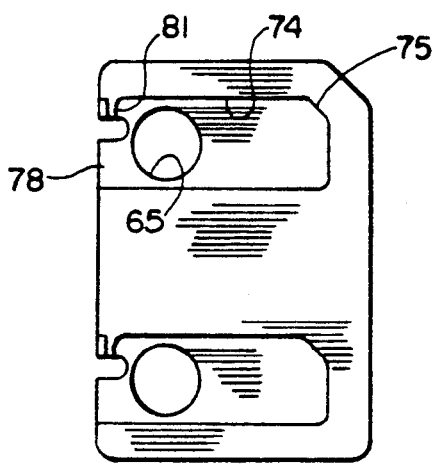
FIG. 10 is a cross-sectional view of the carrier taken substantially along the line 10—10 of FIG. 8.

The pockets 39 and 40 of the pouch 33 may be sized and configured to receive therein other types of dosimeters such as a disc dosimeter that includes on the substrate thereof, in accordance with the invention, indicia embodying a machine readable bar code, as illustrated in FIG. 5, wherein primed reference numerals designate elements corresponding generally to those identified above by the same unprimed reference numerals.

Referring now to FIGS. 6 and 7, there is illustrated at 60 a carrier for enabling the reading of the individual dosimeters in a TLD reader designed to read the aforementioned TLD cards containing multiple TL elements. A card reader, such as a Model 6600 or 8800 TLD reader sold by Solon Technologies, Inc. of Solon, Ohio, includes a mechanism for advancing TLD cards from a source thereof along a path passing between oppositely disposed photomultiplier tubes and respective heat sources at a read station. The mechanism includes a means for positioning the card between the light detectors and heat sources in the read station so that each TL element of the card is disposed in registration with an opposed light detector and heat source. The card reader also includes a mechanism for removing the card after it has been read. The Model 6600 and 8800 TLD readers use a non-contact heating technique based on a stream of hot nitrogen gas as is further described in U.S. Pat. No. 4,835,388, which is hereby incorporated herein by reference.

The carrier 60 has essentially the same external configuration as a standard TLD card. The carrier, however, is provided with two slots 61 and 62 for receiving the individual extremity dosimeters 10 and positioning the active TL element thereof at respective ones of two of the four read sites of a standard TLD card used in the above mentioned readers. One side of the carrier is provided with a window 63 for each dosimeters slot 61, 62 through which the identification bar code on the dosimeter may be machine read by a scanning device in the reader or in an associated dosimeter identification read station just after or more preferably just prior to processing through the reader, so that the TL response data will be correctly electronically reported for each dosimeter that is tagged to a specific individual in the system's database. The other side of the carrier also is provided with an opening 65 for each carrier slot for application of heat to the back side of the TL element. Scintillation light emissions from the heated TL element may be detected through the window 63 by a photomultiplier tube or other light detector in the reader.

The above mentioned TLD readers and similar readers heretofore have included bar code scanners for reading linear bar codes applied to the TLD cards, such as in the manner in which the bar code 68 is applied to the carrier 60. These readers may be modified by providing one or more bar code scanners for reading the bar codes on the extremity dosimeters 10 either simultaneously or sequentially. Preferably two bar code scanners are provided for reading the bar codes on respective dosimeters in each carrier as the carrier is advanced through the reader. This provides for direct and electronic identification of the dosimeter and correlating of the dosimeter's light output to the identificaton code in the reader or system computer without human intervention.

Referring additionally to FIGS. 8-11, the extremity dosimeter carrier 60 consists of two relatively rigid plates 70 and 71 of essentially non-luminescent material. A suitable material is aluminum and the two aluminum plates are secured together by suitable means such as, for example, rivets or an adhesive bonding together the mating surfaces of the two plates along a parting plane indicated at 72. The plates 70 and 71 form therebetween the slots 61 and 62. More particularly, each slot 61, 62 is formed by a recess 74 in the inner surface of the back plate 71. The recess 74 has a depth slightly greater than the thickness of the extremity dosimeter substrate 15. The recess also has a peripheral shape corresponding to the peripheral shape of the dosimeter substrate 15, including a chamfered corner 75 corresponding to a chamfered corner 76 (FIG. 6) of the dosimeter substrate 15. The chamfered corner of the dosimeter substrate functions as a key to insure that the dosimeter is inserted into the carrier slot in the proper orientation. At the other or outer end of the recess the back plate 71 has formed therein the opening 65 through which a TL element centered with respect to such opening may be heated as by directing hot gas through such opening and against the back side of the dosimeter substrate to which the TL body 13 is attached.

In opposition to the recess 74 the front plate 70 is provided with the elongated window 63. The elongated window has a width less than the width of the recess 74 and extends from a rounded end coaxial with the circular opening 65 in the back plate to a generally squared off end for external reading of the bar code on the extremity dosimeter and also reading of the TL body.

Figure 11:
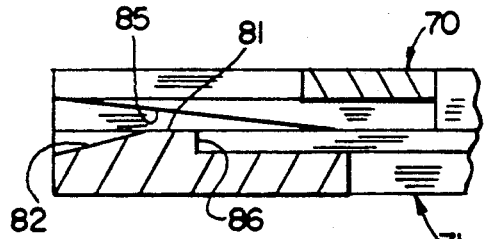
FIG. 11 is an enlarged portion of the FIG. 8.

At the outer end of the recess 74 the front and back plates 70 and 71 are provided with opposed channels 77 and 78 which cooperate to define a slot opening 79 through which the extremity dosimeter may be inserted into the carrier slot. The channel 78 in the back plate 71 at the outer end of the recess 74 has a depth equal that of the recess but a slightly lesser width. Consequently, a portion of the end wall of the recess 74 is left preferably at one side of the recess to form a catch 81 for capturing the dosimeter upon full insertion into the slot. As best seen in FIG. 11, the top of the catch preferably is sloped to form a ramp surface 82 for guiding an adjacent edge portion of the dosimeter substrate over the catch during insertion of the extremity dosimeter into the dosimeter slot in the carrier. Opposite the ramp surface the front plate 70 is provided with a recess 84 which allows the edge portion of the dosimeter substrate to pass over the catch. Preferably, the bottom surface 85 of the recess 84 is sloped opposite the ramp surface 82 and extends through the region of the ramp to a point spaced inwardly from the inner wall surface 86 of the catch. This sloped bottom surface 85 allows the adjacent edge portion of the dosimeter substrate to pass over the ramp 81 and then operates to urge the edge portion of the substrate into the recess 74 until the back edge of the dosimeter substrate clears the inner end of the catch at which point the resilient nature of the substrate will cause the rear end of the dosimeter substrate to snap into the recess 74 and become engaged by the catch at surface 86 for retention of the dosimeter in the carrier. The recess 84 in the front plate forms a side extension of the channel 77 which is of sufficient depth to permit passage of the TL body 13 into the carrier slot, which TL body may extend above the front surface of the dosimeter substrate 15 as seen in FIG. 2.

Full insertion of the dosimeter 10 into the carrier slot 61, 62 is facilitated by the provision of a notch 88 at the insertion end of each carrier slot. The notch 88 preferably is located transversely adjacent to the catch 81 and extends inwardly to a point overlapping a portion of the recess 74. This exposes a portion of a loaded dosimeter substrate for gripping with a pair of tweezers, automatic gripping jaws or the like for effecting removal of a dosimeter from the carrier slot. For example, a pair of gripping jaws may be moved into the notch to engage opposite sides of the dosimeter substrate in the proximity of the catch. The gripping jaws may then be shifted in a direction perpendicular to the plane of the carrier to lift the adjacent corner portion of the dosimeter substrate above the catch whereafter the gripping jaws may be moved in a direction parallel to the longitudinal access of the carrier slot to pull the dosimeter out of the carrier slot. Insertion of the dosimeter into the slot can be performed in the reverse manner or alternatively the dosimeter may be started in the slot and a simple pusher used to push the dosimeter the rest of the way into the slot, the pusher moving into the notch to insure that the dosimeter is fully seated in the recess 74 with one corner thereof caught by the catch 81.

With the aforedescribed dosimeter, holder and carrier, a chain of custody may be reliably maintained for extremity radiation monitoring. In accordance with the invention this is accomplished by an extremity dosimeter chain of custody system and method which controls distribution and reception of dosimeters and reliably correlates personnel information to the extremity dosimeter as well as the extremity radiation dose values. An individual may have one or more dosimeters assigned to him/her at any one time and may have more than one dosimeter per body location. The placement of the dosimeters may vary from head to toe with positions typically on the extremities.

Figure 12:
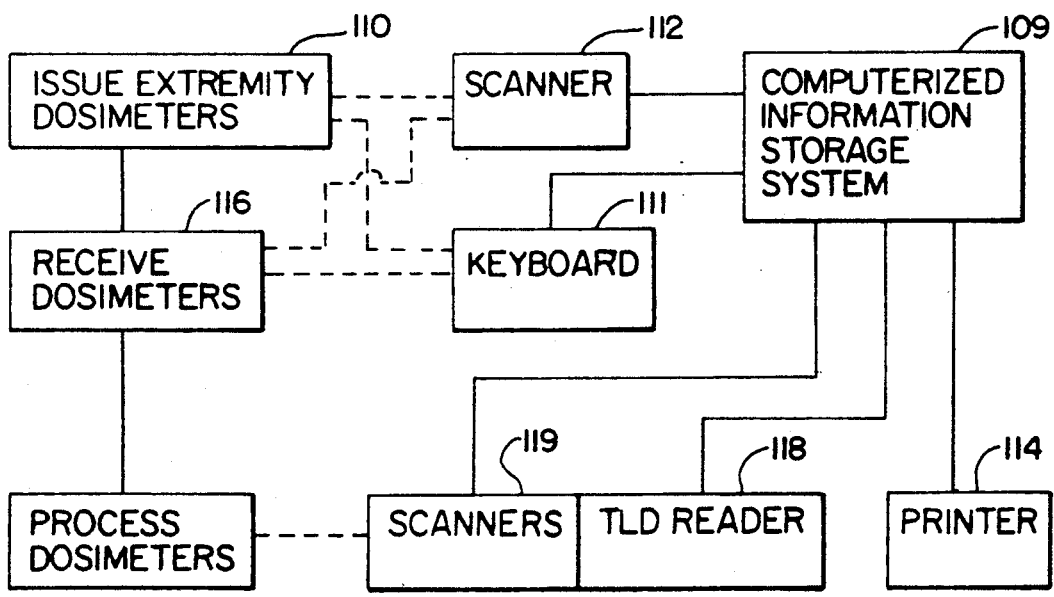
FIG. 12 is a diagrammatic illustration of an extremity dosimetry system and method according to the invention.

The system and method are diagrammatically illustrated in FIG. 12. The heart of the system is a computerized information storage system 109 which includes one or more computers or processors suitably programmed to perform the hereinafter described functions. As discussed further below, the system's functions may be distributed among several computers located at different sites. The various other components of the system and details of the computerized information storage system are described below in conjunction with the following description of two different modes of operation according to the invention.

According to one mode of operation, extremity dosimeters each integrally bearing a unique machine readable identification code are assigned to respective users for wearing by the user on a designated part of his/her body as indicated at 110 in FIG. 12. Although provision may be made for manual entry of the identification number from a keyboard 111, preferably the identification code is inputted into the computerized information storage system by using a bar code scanner 112 to scan the bar code on the extremity dosimeter. The identification code is stored in the computerized information storage system 109 along with information identifying the user such as, for example, the user's name. The information may be stored, for example, in a dosimeter database along with the user identification (name and/or identification number). Depending on the particular application, the dosimeter database may also include, in each record, fields for recording the filter material used with the dosimeter, the anneal date and time when the dosimeter was last annealed, the location of the facility to which the user is assigned, the user's work location, the body position for the dosimeter, the issue date and time when the dosimeter was issued, the return date and time when the dosimeter was returned, the current TL value or values, an element correction coefficient (ECC) for the dosimeter and a reader correction factor (RCF) applied by the reader during readout of the current TL value. The foregoing database fields provide pertinent information regarding each extremity dosimeter for maintaining a chain of custody for the extremity dosimeter and also for enabling calculation of meaningful dose information obtained from the TL value reported by the TLD reader.

After an extremity dosimeter has been assigned to an individual by recording of its identification code against the individual in the computerized information storage system, the extremity dosimeter may be assembled into an appropriate holder or otherwise adapted for permitting wearing of the dosimeter at the specified body location. If the above-described holder is used, the extremity dosimeter is inserted into the dosimeter pouch along with a filter, if any. Also, more than one dosimeter may be inserted into the pouch as may be dictated by the type or types of radiation to be detected. Preferably, the pouch has a label applied thereto which identifies the user and also preferably the body location at which the pouch is to be worn, an identification of the work site and, if desired, the identification code for the dosimeter or dosimeters carried in the pouch. The computerized information storage system may be appropriately connected to a printer 114 for generating the label which may be applied to the holder as by insertion into the label pocket in the pouch or externally using an adhesive. The label also preferably includes a holder identification code preferably in both human readable and machine readable formats. The holder identification code is related to the extremity dosimeter or dosimeters carried in the holder as by entry into the dosimeter database which may include in each dosimeter record a field for the identification code for the holder in which the dosimeter is carried. The provision of an identification code on the holder provides for tracking of the holder and, more particularly, the dosimeter or dosimeters contained therein. As above indicated, the identification code on the dosimeter contained in the pouch may not be readable from outside the pouch. However, the location of the dosimeter can be precisely determined in that during wearing of the dosimeter by the user the dosimeter is integrally contained in the pouch and any attempt to remove the dosimeter from the pouch would be immediately evident.

After the label and dosimeters have been assembled into the respective pockets in the holder pouch, the open ends of the pockets may be simultaneously closed by heat sealing or welding as above described. In this manner the contents of the holder are made integral with the holder when released to the user for wearing. That is, the contents of the label and dosimeter pockets cannot be removed without leaving visible signs that the holder has been tampered with.

The holders containing dosimeters and labels as above described are distributed to the individual users for wearing at the specified body locations. After a prescribed period such as, for example, daily, weekly, monthly, etc., the dosimeters, as indicated at 116, are retrieved from the individual users for processing through a TLD reader to extract therefrom the TL dose information. At the same time new dosimeters may be issued to the users as may be needed to cover the period during which the previously issued dosimeters are being processed to extract radiation dose information therefrom. Reception of the holders may be logged into the computerized information storage system preferably by scanning the machine readable information code on the dosimeter holder. The dosimeters therein may then be read by opening the holder and removing the dosimeter or dosimeters therefrom and inserting them into a suitable carrier for transport through the TLD reader. By way of specific example, two extremity dosimeters may be inserted into respective dosimeter slots in the above-described carrier and a stack of the carriers then loaded into a TLD reader 118 for processing. The reader has associated therewith scanners 119 for reading the identification codes on the individual extremity dosimeters, which identification codes are recorded for matching with the TL radiation dose information reported by the reader. The TLD reader system, in addition to reading the identification code for each dosimeter, reads the TL element and transmits to the computerized information storage system 109 the identification code and TL dose information (TL value). The TL dose information may be stored in the dosimeter database in the TL value field and/or fields for the corresponding dosimeter identification code.

After the extremity dosimeters have been read by the TLD reader 118 they can then be annealed for reuse. The TLD reader preferably incorporates an anneal function, as do the above-mentioned Model Nos. 6600 and 8800 TLD readers. The anneal date and time can then be electronically transmitted by the TLD reader to the computerized information storage system 109 for updating of the extremity dosimeter database records.

At this point the TL information obtained from the extremity dosimeters may be processed using a conventional algorithm to compute dose. The particular algorithm to convert the raw reader data to useful dose information does not form a part of this invention inasmuch as the system and method are adaptable for providing the necessary raw data for various algorithms.

One or more functions of the above-described computerized information storage system may be performed at different sites. For example, there may be provided a main distribution center or station and one or more site issue stations each including an appropriately programmed computer for performing the functions assigned to the respective stations. The main distribution station may be provided with the capability to receive and issue extremity dosimeters as well as to query the personnel and TLD information stored in the system's data storage. These same functions may also be performed at the site issue station. The main distribution station also has the added capability of reading the dosimeters to extract the TLD information, of merging the site issue station or stations database into the main database at the main distribution station, of tracking of the dosimeters and dosimeter holders, and of computing and storing dose information. Each site issue station may comprise a main computer unit to which an appropriate scanner or scanners is interfaced for reading of the machine readable codes on the dosimeters and/or holders therefor. The computer units may also have associated therewith a display and keyboard as well as a printer for printing reports and labels. The main distribution station may include a similar configuration and additionally a TLD reader suitably interfaced to the main computer system unit in conventional manner. Each of the individual components may be selected from readily available hardware items and readily programmed by a skilled programmer to carry out the functions hereindescribed.

According to another mode of operation particularly adaptable to the use of a main distribution station and one or more remotely located site issue stations, one or more extremity dosimeters and filters, if any, may be preassembled into holders after they have been calibrated (e.g., element correction coefficients assigned in conventional manner). If the above-described pouch is used, the extremity dosimeter is inserted into the dosimeter pouch along with a filter, if any. Also, more than one dosimeter may be inserted into the pouch as may be dictated by the type or types of radiation to be detected. The pouch has indicia applied thereto as by means of a label inserted into the label pocket in the pouch or externally using an adhesive. The indicia includes a holder identification code preferably in both human readable and machine readable formats. The holder identification code is related to the extremity dosimeter or dosimeters carried in the holder as by entry into a dosimeter database maintained in the computerized information storage system 109, which database may include in each dosimeter record a field for the identification code for the holder in which the dosimeter is carried. The provision of an identification code on the holder provides for tracking of the holder and, more particularly, the dosimeter or dosimeters contained therein. Even though the identification code on the dosimeters may not be viewable by virtue of their being sealed in pouches, the location of the dosimeters can be tracked in that during wearing by users the dosimeters are integrally contained in the pouches and any attempt to remove the dosimeters from the pouches would be immediately evident. Preferably the identification codes are machine read, rather than keyboard entered, into the computerized information storage system during assembly of the dosimeters into the pouches or other holders to provide pre-assembled dosimeter-holder devices.

The pre-assembled dosimeter-holder devices, be they in the form of rings, patches, bracelets, etc., may now be distributed to one or more site issue stations for issuance to users. Again with reference to FIG. 12, the dosimeter-holder devices containing dosimeters and each integrally bearing a unique machine readable identification code are assigned to respective users for wearing by the user on a designated part of his/her body as indicated at 110. Although provision may be made for manual entry of the holder (pouch) identification number from a keyboard 111, preferably the identification code is inputted into the computerized information storage system 109 by using a bar code scanner 112 to scan the bar code on the holder. The holder identification code is stored in the computerized information storage system 109 along with information identifying the user such as, for example, the user's name. The information may be stored, for example, in the dosimeter database along with the user identification (name and/or identification number). Depending on the particular application, the dosimeter database, as before, may also include, in each record, fields for recording the filter material used with the dosimeter, the anneal data and time when the dosimeter was last annealed, the location of the facility to which the user is assigned, the user's work location, the body position for the dosimeter, the issue date and time when the dosimeter was issued, the return date and time when the dosimeter was returned, the current TL value or values, an element correction coefficient (ECC) for the dosimeter and a reader correction factor (RCF) applied by the reader during readout of the current TL value. The foregoing database fields provide pertinent information regarding each extremity dosimeter for maintaining a chain of custody for the extremity dosimeter and also for enabling calculation of meaningful dose information obtained from the TL value reported by the TLD reader.

After a prescribed period such as, for example, daily, weekly, monthly, etc., the dosimeters, as indicated at 116, are retrieved from the individual users for processing through a TLD reader to extract therefrom the TL dose information at the main distribution station. At the same time new dosimeter-holder devices may be issued to the users as may be needed to cover the period during which the previously issued dosimeter-holder devices are being processed to extract radiation dose information therefrom. Reception of the holders may be logged into the computerized information storage system preferably by scanning the machine readable information code on the dosimeter pouch. The dosimeters therein may then be read by opening the pouch and removing the dosimeter or dosimeters therefrom and inserting them into a suitable carrier for transport through the TLD reader. By way of specific example, two extremity dosimeters may be inserted into respective dosimeter slots in the above-described carrier and a stack of the carriers then loaded into a TLD reader 118 for processing. The reader has associated therewith scanners 119 for reading the identification codes on the individual extremity dosimeters, which identification codes are recorded for matching with the TL radiation dose information reported by the reader. The TLD reader system, in addition to reading the identification code for each dosimeter, reads the TL element and transmits to the computerized information storage system 109 the identification code and TL dose information (TL value). The TL dose information may be stored in the dosimeter database in the TL value field and/or fields for the corresponding dosimeter identification code.

After the extremity dosimeters have been read by the TLD reader 118 they can then be annealed for reuse and pre-assembled into holders for redistribution to the site issue stations. The TLD reader preferably incorporates an anneal function, as do the above-mentioned Model Nos. 6600 and 8800 TLD readers. The anneal date and time can then be electronically transmitted by the TLD reader to the computerized information storage system 109 for updating of the extremity dosimeter database records.

At this point the TL information obtained from the extremity dosimeters may be processed using a conventional algorithm to compute dose. The particular algorithm to convert the raw reader data to useful dose information does not form a part of this invention inasmuch as the system and method are adaptable for providing the necessary raw data for various algorithms.

The individual dosimeters described above may have use other than in an extremity dosimetry system. For example, the dosimeters may be used for beam profiling. The individual dosimeters may be assembled into an array or mosaic with the active portions of the dosimeters being positioned at specific spaced locations in the array, each location having associated therewith a dosimeter identified by an integral identification code as aforedescribed. The active TL elements may be closely spaced; for example, adjacent TL elements may be spaced apart by a distance equal or less than about $\frac{1}{2}$ inch, and more preferably by a distance equal or less than about $\frac{1}{4}$ inch apart. This affords high resolution, considering that the above described dosimeter may be arranged in the array with a density of about 16 TL elements per square inch. The array of dosimeters may be placed in the path of a radiation beam, such as the x-ray beam in a CT scanner, with each dosimeter being exposed to a specific portion of the beam. After exposure the array may be removed and the individual dosimeters read and the TL data reported against each identification code which is related to a specific location in the array. The dosimeters may also be used for beam profiling in accelerators.

Although the invention has been shown and described with respect to a preferred embodiment, equivalent alternations and modifications will occur to others skilled in the art upon the reading and understanding of this specification. The present invention includes all such equivalent alterations and modifications, and is limited only by the scope of the following claims.

What is claimed is:

1. An extremity dosimeter comprising a solid TL body affixed to a non-luminescent flexible substrate that has integrally associated therewith indicia embodying a machine readable identification code, said substrate including a first layer to which said solid body is affixed and a second layer of equal or greater thickness material.

2. An extremity dosimeter as set forth in claim 1, wherein said first and second layers of said substrate are each formed of a flexible material capable of maintaining its structural and functional integrity at temperatures up to about 425° C.

3. An extremity dosimeter as set forth in claim 2, wherein said flexible material is a polyimide.

4. An extremity dosimeter as set forth in claim 1, wherein said second layer includes an aperture in which said solid TL body is at least partly contained.

5. An extremity dosimeter as set forth in claim 1, wherein said TL body comprises an alkali/alkaline metal-fluoride TL material.

6. In combination, an extremity dosimeter as set forth in claim 1, a holder for said dosimeter, said holder comprising a generally flat and flexible single-use dosimeter pouch including at least one pocket for containing the dosimeter, and means for attaching the dosimeter pouch to a body part.

7. A combination as set forth in claim 6, wherein said pouch includes two flexible panels peripherally joined together to form said pocket.

8. A combination as set forth in claim 6, wherein said means for attaching includes a strap threaded through slots at opposite ends of said dosimeter pouch.

9. A combination as set forth in claim 8, wherein said strap is adjustable in length to accommodate different thickness body appendages.

10. A combination as set forth in claim 8, wherein said strap is interchangeable with a different length or type of strap for different applications.

11. In combination, an extremity dosimeter and a holder for said dosimeter, said dosimeter comprising a solid TL body affixed to a non-luminescent flexible substrate that has integrally associated therewith indicia embodying a machine readable identification code, and said holder comprising a generally flat and flexible single-use dosimeter pouch including at least one pocket for containing the dosimeter, said pouch including two flexible panels peripherally joined together to form said pocket, at least one of said panels or at least a portion of one of said panels proximate the indicia on said dosimeter being transparent to provide a window through which the indicia may be read from outside said dosimeter pouch, and there being provided means for attaching the dosimeter pouch to a body part.

12. In combination, an extremity dosimeter and a holder for said dosimeter, said dosimeter comprising a solid TL body affixed to a non-luminescent flexible substrate that has integrally associated therewith indicia embodying a machine readable identification code, and said holder comprising a generally flat and flexible single-use dosimeter pouch including at least one pocket for containing the dosimeter, said pouch including two flexible panels peripherally joined together to form said pocket, both panels being opaque to light, and said holder further comprising a label integral with said pouch, said label including a machine readable code identifying said holder, and there being provided means for attaching the dosimeter pouch to a body part.

13. A combination as set forth in claim 12, wherein said pouch includes a second pocket, and said label is inserted in said second pocket.

14. A combination as set forth in claim 13, wherein said pouch includes a third flexible panel forming said second pocket with one of said two panels, and said third panel has at least a portion thereof that is transparent for viewing of the label from outside said dosimeter pouch.

15. In combination, an extremity dosimeter and a carrier for enabling the reading of the extremity dosimeter in a TLD reader designed to read TLD cards containing multiple TL elements at respective read sites, said extremity dosimeter comprising a solid TL body affixed to a non-luminescent flexible substrate that has integrally associated therewith indicia embodying a machine readable identification code, said carrier including at least one slot for receiving said extremity dosimeter and positioning said solid TL body at a selected one of said read sites, and said carrier including on one side thereof a window for said slot through which said identification code can be machine read.

* * * * *